United States Patent [19]

Oka

[11] Patent Number: 4,975,793
[45] Date of Patent: Dec. 4, 1990

[54] TAPE LOADING MECHANISM FOR CAUSING A LENGTH OF TAPE TO TRAVEL ALONG A ROTARY HEAD DRUM

[75] Inventor: Syousuke Oka, Nagaokakyo, Japan

[73] Assignee: Mitsubishi Denki Kabushiki Kaisha, Tokyo, Japan

[21] Appl. No.: 265,681

[22] PCT Filed: Feb. 26, 1988

[86] PCT No.: PCT/JP88/00206

§ 371 Date: Oct. 25, 1988

§ 102(e) Date: Oct. 25, 1988

[30] Foreign Application Priority Data

Feb. 26, 1987 [JP] Japan .................................. 62-46002
Sep. 30, 1987 [JP] Japan ................................ 62-150621

[51] Int. Cl.⁵ ........................................... G11B 15/665
[52] U.S. Cl. ..................................................... 360/85
[58] Field of Search ......................................... 360/85

[56] References Cited

U.S. PATENT DOCUMENTS 4,807,065 2/1989 Kwon ..................................... 360/85

FOREIGN PATENT DOCUMENTS

| | | |
|---|---|---|
| 55-128267 | 9/1980 | Japan . |
| 55-141368 | 10/1980 | Japan . |
| 56-114154 | 9/1981 | Japan . |
| 56-115082 | 9/1981 | Japan . |
| 56-174143 | 12/1981 | Japan . |
| 57-4061 | 1/1982 | Japan . |
| 58-23348 | 2/1983 | Japan . |
| 58-32269 | 2/1983 | Japan . |
| 58-150157 | 9/1983 | Japan . |
| 59-113548 | 6/1984 | Japan . |
| 59-186162 | 10/1984 | Japan . |
| 59-188868 | 10/1984 | Japan . |
| 60-106058 | 11/1985 | Japan . |
| 61-184755 | 8/1986 | Japan . |
| 62-154255 | 7/1987 | Japan . |
| 62-147151 | 9/1987 | Japan . |
| 62-256256 | 11/1987 | Japan . |
| 63-16641 | 2/1988 | Japan . |

*Primary Examiner*—Robert S. Tupper

[57] ABSTRACT

A tape loading mechanism in a magnetic recording and/or reproducing apparatus secures a sufficiently accurate positioning of a tape guide during a loading condition and also during an unloading condition with a tape guide arm (58) which is moved in association with the rotation of revolving arms (41) and (42) for moving a pair of guide post members (7) and (8). The movement of the tape guide arm (58) is stopped at a stopper member (60) at a predetermined position through which a length of magnetic tape is moved. A biasing member (54) is provided for pressing the tape guide arm (58) against the stopper member (60), thereby accurately positioning a tape guide (17) mounted on the tape guide arm (58). The mechanism can be used in a digital tape recorder or a video tape recording and/or reproducing apparatus.

14 Claims, 7 Drawing Sheets

Fig.4

TAPE LOADING MECHANISM FOR CAUSING A LENGTH OF TAPE TO TRAVEL ALONG A ROTARY HEAD DRUM

FIELD OF TECHNOLOGY

The present invention relates to a tape loading mechanism in a magnetic recording and/or reproducing apparatus for causing a length of magnetic tape to travel along a rotary head drum.

BACKGROUND ART

FIG. 1 is a structural diagram showing one example of the prior art tape loading mechanism. In this figure, reference numeral 1 represents a chassis, reference numeral 2 represents a rotary head drum, and reference numeral 3 represents a tape cassette accommodated in the chassis 1 having a supply reel 24 from which the length of magnetic tape 4 is drawn so as to be turned around the rotary head drum and as to be wound around a tape-up reel 23. Reference numerals 25 and 26 represent respective guide rods disposed inside the tape cassette 3. Reference numerals 5 and 6 represent respective guide grooves formed one on each side in the chassis 1, reference numerals 7 and 8 represent respective guide post member slidably supported in the associated guide grooves 5 and 6, reference numerals 9 and 10 represent respective guide stopper rigidly mounted on the chassis 1 for receiving the associated guide post members 7 and 8 during a loading condition, and reference numeral 11 represents a capstan drive motor for driving a capstan shaft 12. Reference numeral 13 represents a pinch roller support arm pivotally mounted on the chassis 1 through a support pin 14 rigidly mounted upright on the chassis 1, said pinch roller support arm having a free end carrying a pinch roller 15 rotatably mounted thereon.

The pinch roller support arm 13 and a driving means therefor are illustrated in FIG. 2. Reference numeral 16 represents a cam plate pivotally mounted on a support shaft of the pinch roller 15 and having a generally intermediate portion thereof provided with a tape guide 17. This cam plate 16 is normally biased in a counterclockwise direction, as viewed in FIG. 2, by a spring member (not shown) and is, so far illustrated, so biased that a free end of the cam plate 16 is engaged to an abutment member 22. When the pinch roller support arm 13 is pivoted in a counterclockwise direction, the cam plate 16 is so pivoted with its free end disengaged from the abutment member 22 and subsequently engaged to a stopper 13a provided on the pinch roller support arm 13. Reference numeral 18 represents a link plate supported for sliding movement in one of the opposite directions, shown by the arrows A and B, while guide by support pins 26 rigidly mounted on the chassis 1 so as to protrude upright from the chassis 1, which link plate 18 can be moved by a loading drive motor through a motion transmitting means (both not shown). Reference numeral 19 represents a slide plate supported slidably on the link plate 18, which plate 19 is normally urged in a direction shown by the arrow A by the action of a tension spring 20 disposed between it and the link plate 18 and is formed with a slot 19a. An engagement pin 21 rigidly secured to a rear end of the pinch roller support arm 13 is engaged in the slot 19a and is operable to rotate the pinch roller support arm 13 when the slide plate 18 is moved.

The operation of the prior art device of the above described construction is as follows. The tape cassette 3 having the length of magnetic tape 4 accommodated therein is placed on the chassis 1. While in this unloading condition, the loading drive motor is driven to move the guide post members 7 and 8 along the guide grooves 5 and 6, respectively, through the motion transmitting means (not shown) to establish a first loading condition.

On the other hand, during the unloading condition, the pinch roller support arm 13 is in a pivoted position shown by the chain line by the action of the link plate 18 held at a position biased in the direction shown by the arrow B in FIG. 2 and, therefore, the cam plate 16 is engaged to the stopper 13a. By the rotation of the loading drive motor for the loading, the link plate 18 is moved in the direction shown by the arrow A through the motion transmitting means (not shown). In this way, the pinch roller support arm 13 is pivoted in a clockwise direction to assume a position shown by the solid line and, therefore, the first loading condition is established wherein the length of magnetic tape 4 does not contact the pinch roller 16, but contact the tape guide 17.

During this first loading condition, the guide post members 7 and 8 are positioned as received by the respective guide stoppers 9 and 10 and the length of magnetic tape 4 is turned a predetermined angle around the rotary head drum 2, but pinch roller 15 is disengaged from both of the length of magnetic tape 4 and the capstan shaft 12, permitting the length of magnetic tape 4 to be transported by the rotary drive of the take-up reel 23. In other words, the length of magnetic tape 4 drawn out from the supply reel 24 is wound upon on the take-up reel 23 after having passed through the guide post member 8, then through the rotary head drum 2, and finally through the guide post member 7.

Also, when the loading drive motor is rotated, the link plate 18 is moved in a direction shown by the arrow A to establish a second loading condition shown in FIGS. 1 and 2. During the movement of the link plate 18, the cam plate 16 is engaged to the abutment member 22 to rotate in a clockwise direction and the pinch roller 15 is brought into engagement with the capstan shaft 12 through the length of magnetic tape 4 and is pressed thereagainst by the action of the tension spring 20. The tape guide 17 is rigidly mounted on the cam plate 16 and, therefore, during the second loading conditions, the position of the tape guide 17 is determined by pinch roller support arm 13 and the engagement between the cam plate 16 and the abutment member 22.

Thus, when the second loading condition is established at which the loading completes, the length of magnetic tape 4 is pressed against the capstan shaft 12 by the pinch roller 15 and can be transported by the drive of the capstan drive motor 11. In this way, the length of magnetic tape 4 is transported past the guide post member 7 and is guided along the tape guide 17 and the guide rod 25 via the capstan shaft 12, finally being wound up around the take-up reel 23.

In the above described prior art tape loading mechanism, the position of the tape guide 17 is determined by the engagement between the link plate 18 and the pinch roller support arm 13 during the first loading condition and tends to be affected by an error in position of the link plate 18 to such an extent that the accuracy of the positioning of the tape guide 17 may be insufficient.

Also, even during the second loading conditions, the position of the tape guide 17 is determined by the pinch roller support arm 13 and the engagement between the cam plate 16 and the abutment member 22 and, therefore, the accuracy of the positioning of the tape guide 17 tends to be insufficient. Because of this reason, the winding angle of the tape guide 17 is not fixed and, therefore, there has been a problem in that stable transport of the length of magnetic tape is difficult to achieve.

Moreover, there are many parts which are engaged with the tape guide 17 and the guide post members 7 and 8 and dimensional relationship among them can not be easily attained. By way of example, dimensional accuracy between the tape guide 17 and the guide post members 7 and 8 can not be easily attained during the unloading condition shown by the single-dotted line in FIG. 3 and, at the time the tape cassette 3 is mounted onto the chassis 1, the tape guide 17 and some other parts cannot be accommodated within an interior space 3a in the tape cassette 23, posing a problem in that they tend to contact the length of magnetic tape 4.

SUMMARY OF THE INVENTION

A tape loading mechanism to which the present invention pertains is such that a tape guide can be moved in operative association with the rotation of a pivot arm for moving a pair of guide post members; a tape guide arm for the support of the tape guide is pivotally supported on a chassis at a pivot point so that the tape guide arm can be related in synchronism with a loading movement of the guide post member; the movement of the tape guide arm is stopped by a stopper member at a predetermined position through which the length of magnetic tape is transported: and there is provided a biasing member for urging the tape guide arm toward the stopper member.

According to the present invention, during either one of the first loading condition and the second loading condition, the tape guide can be accurately retained at the predetermined position to permit the length of magnetic tape to be stably transported while being turned around each guide member through a predetermined angle in contact therewith, and, also, since the drive of the tape guide originates from the pivot arm, the number of intervening component parts can be minimized with the consequence that the relative dimensional relationship between the tape guide and the guide post member can be easily obtained and, in particular, any possible contact between any one of the tape cassette and the length of magnetic tape and the tape guide during the unloading condition can be advantageously avoided, thereby bringing about a high safety factor.

Further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 4 is a top plan view showing an unloading condition of a tape loading mechanism according to one preferred embodiment of the present invention;

DETAILED DESCRIPTION OF THE PREFERRED EMBODIMENTS

Figure 4:
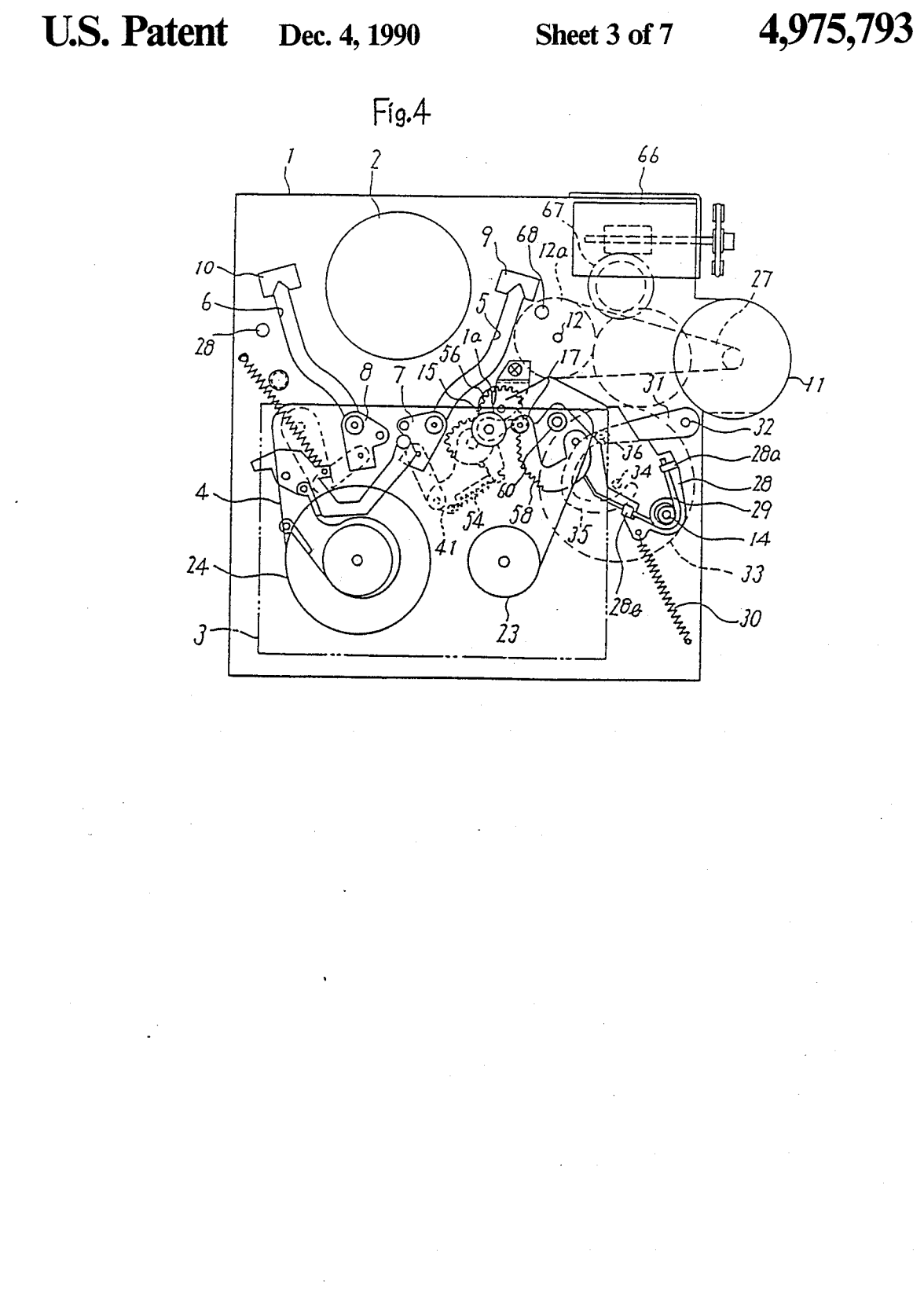
Figure 7:
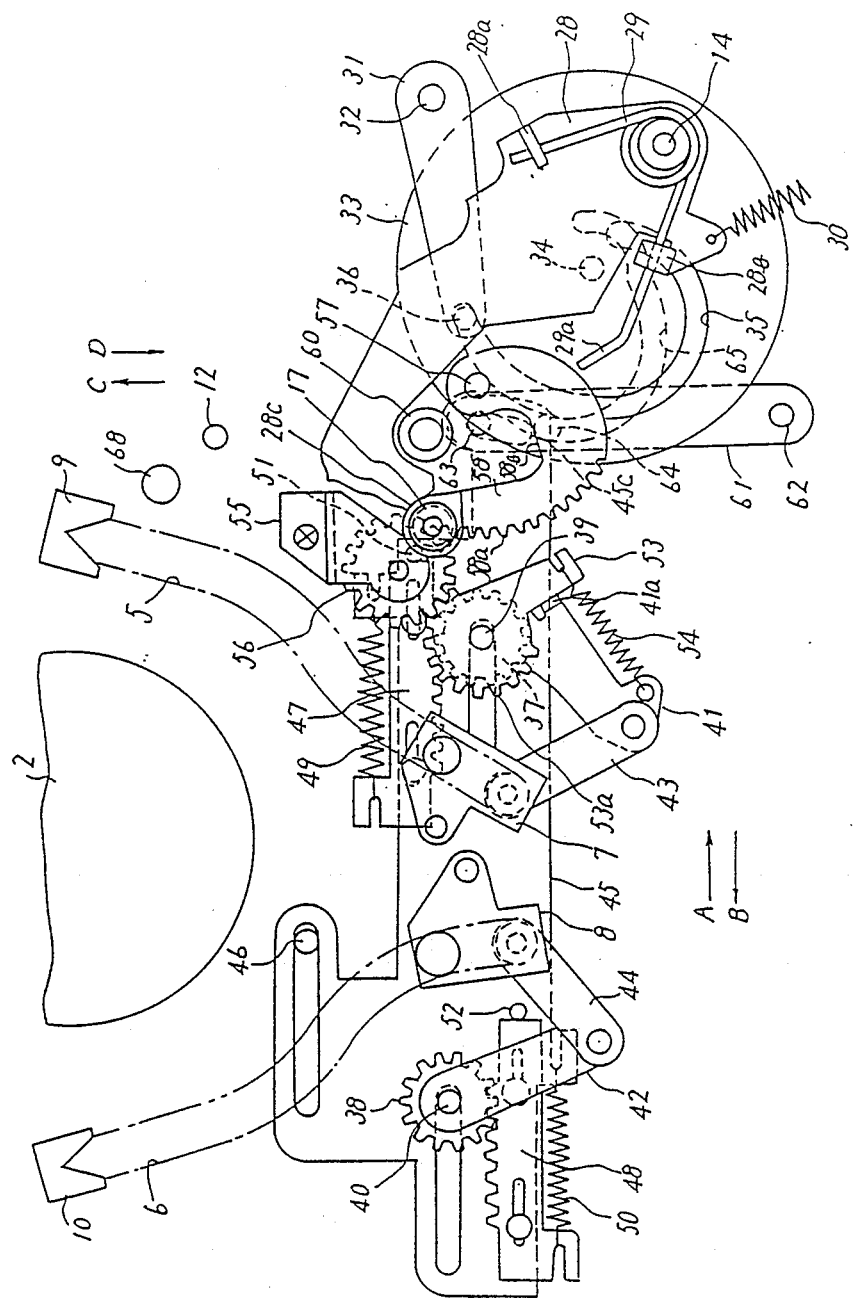
FIG. 7 is a top plan view showing the details of an essential portion of FIG. 4.

FIGS. 4 and 7 are a top plan view and a top plan view on an enlarged scale, respectively, of one embodiment of a tape loading mechanism according to the present invention, which mechanism is held in an unloading condition. In these figures, reference numbers 1 to 12, 14, 15, 17. 23 and 24 represent respective components identical with those used in the prior art device of the previously described construction. The rotation is transmitted from a pulley of the capstan drive motor 11 to a flywheel 12a of the capstan shaft 12 through a belt 27. Reference numeral 28 represents a pinch roller support arm pivotally supported on the support pin 14 rigidly mounted upright on the chassis 1, which pinch roller support arm 28 has a free end carrying the pinch roller 15 rotatably mounted thereon. Reference numeral 29 represents a torsion spring having its opposite ends engaged to respective hooks 28a and 28b formed in the pinch roller support arm 28 and exerting a biasing force tending to separate the opposite ends of the torsion spring 29 away from each other; reference numeral 30 represents a tension spring for biasing the pinch roller support arm 28 in a direction counterclockwise as viewed in these figures; reference numeral 31 represents an engagement lever pivotally supported on a support pin 32 rigidly mounted upright on the chassis 1; and reference numeral 33 represents a cam gear having its outer peripheral portion formed with gear teeth (not shown) and also having one of the opposite surfaces formed with a first cam groove 35 and the other of the opposite surfaces formed with a second cam groove 65, said cam gear 33 being pivotally supported on a support pin 34 rigidly mounted upright on a rear side of the chassis 1.

Figure 10:
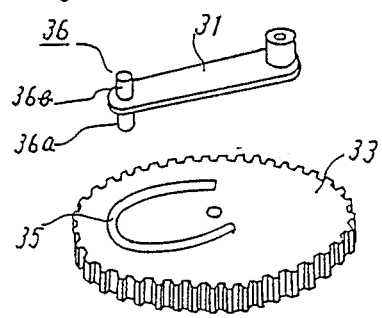
FIG. 10 is an exploded view showing an engagement lever and a cam gear unit shown in FIG. 4.

The engagement lever 31 and the cam gear 33 are illustrated in FIG. 10 in exploded view. A free end of the engagement lever 31 carries an engagement pin 36 fixedly extending therethrough, having a pin lower end 36a engaged in and guided by the first cam groove 35. By this guiding engagement, when the engagement lever 31 is pivoted in a direction counterclockwise, a pin upper end 36b is engaged to one leg portion 29a of the torsion spring 29.

Referring back to FIG. 7, reference numerals 37 and 38 represent respective revolving gears rotatably supported on associated support pins 39 and 40 rigidly mounted upright on the rear surface of the chassis 1, which revolving gears 37 and 38 are provided with respective revolving arms 41 and 42 secured thereto. Reference numeral 43 represents a link pivotally connecting between the revolving arm 41 and the guide post member 7, and reference numeral 44 represents a link pivotally connecting between the revolving arm 42 and the guide post member 8. Reference numeral 45 represents a slide plate supported for sliding movement while guided by support pins 46, rigidly secured to the rear surface of the chassis 1, and the support pins 39 and 40 in one of the opposite directions shown by the arrows A and B. Reference numerals 47 and 48 represent respective rack members supported on respective sides on the slide plate 45 for sliding movement in one of the opposite directions shown by the arrows A and B and meshed respectively with the gears 37 and 38. Reference numerals 49 and 50 represent respective tension springs suspended between the rack members 47 and 48 and the slide plate 45 and adapted to bias the rack members 47 and 48 in the direction shown by the arrow A. With the rack members 47 and 48 so biased by the respective tension springs 49 and 50, these rack members 47 and 48 are held still in engagement with associated stoppers 51 and 52 secured to the side plate 45.

Reference numeral 534 represents a rotation transmitting body formed at an axis of rotation with gear teeth 53a and rotatably supported on the gear 37. This rotation transmitting body 53 is biased in a direction counterclockwise as viewed therein by the action of a biasing member 54, which is comprised of a tension spring suspended between a free end thereof and the revolving arm 41, until is engaged to and is therefore held at a position adjacent an abutment portion 41a of the revolving arm 41.

Reference numeral 55 represents a bracket secured to the chassis 1 and rotatably supporting an intermediate gear 56. The intermediate gear 56, as shown in FIG. 9, extends through a hole 1a formed in the chassis 1 and has upper and lower gear portions exposed upwardly and downwardly through the chassis 1, said lower gear portion being meshed with the teeth 53a of the rotation transmitting body 53.

Figure 9:
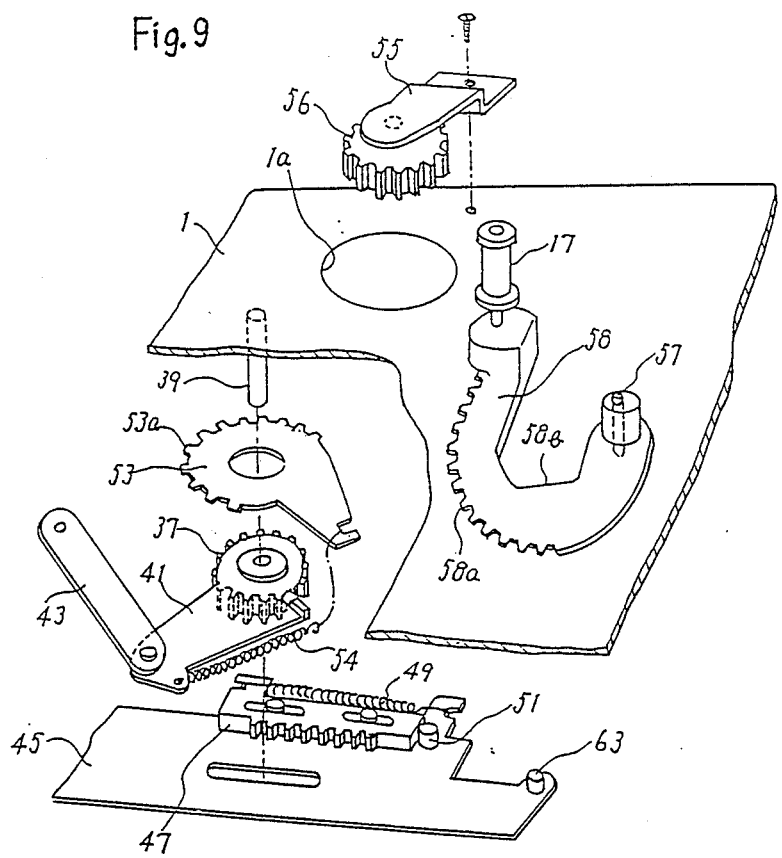
FIG. 9 is an exploded view showing the rotating drive means for one of pivot arms and a tape guide arm shown in FIG. 4.

Referring now to FIGS. 7 and 9, reference numeral 58 represents a tape guide arm pivotally supported on a support pin 57 secured upright to the chassis 1, said tape guide arm 58 having a free end carrying the pinch roller 17 rotatably mounted thereon. This tape guide arm 58 has a generally intermediate peripheral portion formed with gear teeth 58a with which the intermediate gear 56 can be engaged for rotating the tape guide arm 58.

In FIG. 7, reference numeral 60 represents a stopper member rigidly secured to the chassis 1 to which an abutment 58b of the guide arm 58 is engaged so that the rotation of the tape guide arm 58 in the clockwise direction can be stopped at a predetermined advance position of the pinch roller 17. Reference numeral 61 represents a transmission arm having one end rotatably mounted on a support pin 62 secured perpendicular to the rear surface of the chassis 1. This transmission arm 61 has an engagement pin 64 secured thereto at a portion thereof adjacent the free end thereof, said engagement pin 64 capable of being engaged and guided in the second cam groove 65 of the cam gear 33 for pivoting the transmission arm 61. This transmission arm 61 also has a transmission pin 63 secured to the free end thereof, which pin 63 is engaged in a slot 45c formed in one end portion of the slide plate 45 for moving the slide plate 45 in one of the opposite directions shown by the respective arrows A and B.

Referring back to FIG. 4, reference numeral 66 represents a loading drive motor mounted on the chassis 1 and operable to transmit a rotational drive to the cam gear 33 through a belt means and also through a reduction gear means 67 positioned below the chassis 1. Reference numeral 68 represents a pair of guide rods on respective sides which are secured to the chassis 1.

The operation of the device according to the above described embodiment will now be described. Referring to FIGS. 4 and 7, the tape cassette 3 is accommodated in the chassis 1 with the length of magnetic tape 4 held in the unloading condition. All of the guide post members 7 and 8, the pinch roller 15 and the tape guide 17 are positioned inside a space within the tape cassette 3. The engagement pin 64 on the transmission arm 61 is located in a large diameter portion about the axle of the second cam groove 65, and the slide plate 45 is held at a position confronting the directions shown by the arrow B. Accordingly, by the transmission through the rack member 47, the gear 37, the rotation transmitting body 53 and the intermediate gear 56, the tape guide arm 58 is in a condition pivoted furthest in the counterclockwise direction. Moreover, the pinch roller arm 28 is biased so as to rotate in he counterclockwise direction by the action of the tension spring 30 with the abutment 28c engaged to the tape guide arm 58 and, therefore, the tape guide arm 58 is normally biased in a counterclockwise direction thereby to counteract with a backlash induced by the intermediate gear 56 and others.

When the loading drive motor 66 is driven to rotate the cam gear 33 in the clockwise direction, the engagement pin 64 is guided along the second cam groove 65 and the slide plate 45 is moved in the direction shown by the arrow A by the clockwise rotation of the transmission arm 61. The rack members 47 and 48 are moved in the direction shown by the arrow A together with the slide plate 45 while urged against the stoppers 51 and 52 by the action of the respective tension springs 49 and 50 thereby to rotate the gears 37 and 38 in the clockwise and counterclockwise directions, respectively. Thereby, the guide post members 7 and 8 are moved along the guide grooves 5 and 6 in the direction shown by the arrow C through the revolving arm 41 and the link plate 43 and through the revolving arm 42 and the link plate 44, respectively. Also, the rotation transmitting body 53 is urged against the abutment 41a of the revolving arm 41 by the action of the biasing member 54 and, therefore, it can be pivoted together with the revolving arm in the clockwise direction to permit the tape guide arm 58 to be rotated clockwise through the intermediate gear 56. Although the pinch roller support arm 28 is engaged at the abutment 28c to the tape guide arm 58 by the action of the tension spring 30, the moment exerted by the biasing member 54 to rotate the tape guide arm 58 is so selected as to be greater than the moment exerted by the tension spring 30 to the tape guide arm 58 and, therefore, the pinch roller support arm 28 is, while pressed by the tape guide arm 58, pivoted in the clockwise direction.

In this way, when the loading drive motor 66 continues its rotation, the length of magnetic tape 4 within the tape cassette 3 is drawn therefrom in a loading direction by the action of the guide post members 7 and 8, the pinch roller 15 and the tape guide 17.

Also, by the rotation of the loading drive motor 66, the abutment 58b of the tape guide arm 58 is brought into engagement with the stopper member 60. At this time, the guide post members 7 and 8 have not yet brought into engagement with the respective guide stoppers 9 and 10 and the slide plate 45 continues its movement in the direction shown by the arrow A. It is to be noted that, since the moment exerted by the gear 37 due to the tension spring 49 is so selected as to be sufficiently greater than the moment exerted by the gear 37 due to the biasing member 54, the tension spring 49 will not elongate, but the biasing member 54 elongates. Accordingly, the guide post members 7 and 8 can move further in the direction shown by the arrow C and, when they are brought into engagement with the respective guide stoppers 9 and 10, the tension springs 49 and 50 elongate with the guide post members 7 and 8 urged against the guide stoppers 9 and 10 by the effect of the spring forces of the tension springs 49 and 50. On the other hand, the tape guide arm 58 assume respective positions determined by the pressing force exerted upon elongation of the biasing member 54 subsequent to the abutment thereof against the stopper member 60.

Figure 1:
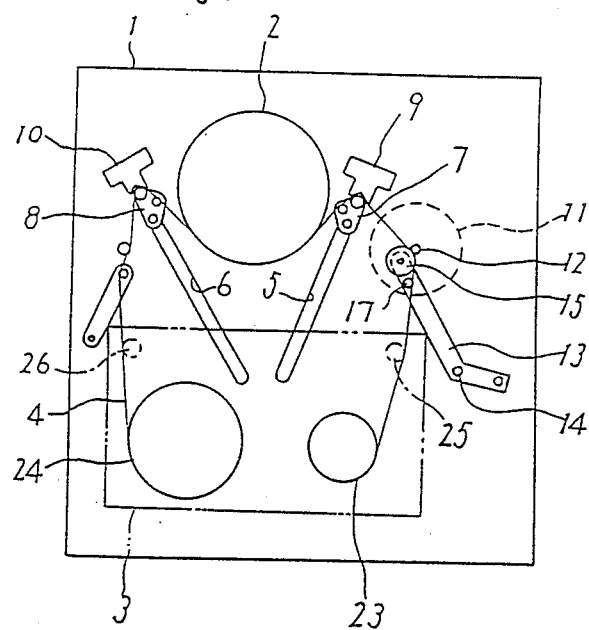
FIG. 1 is structural diagram showing one example of the prior art tape loading mechanism.
Figure 2:
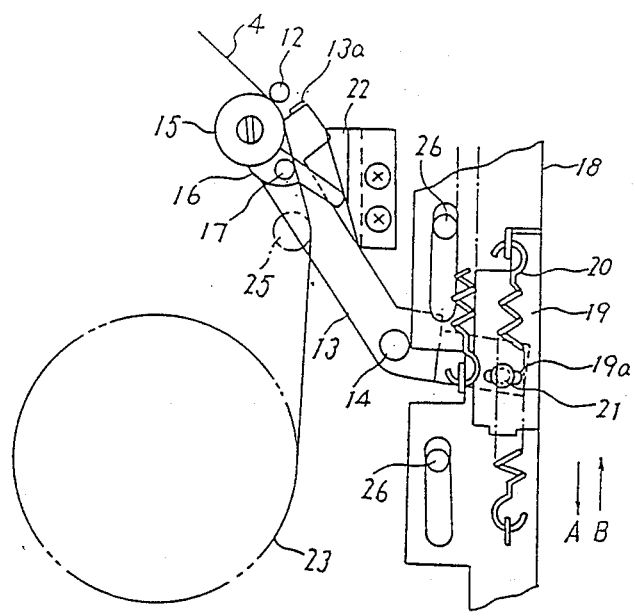
FIG. 2 is a top plan view showing a rotating drive means for the pinch roller support arm shown in FIG. 1.
Figure 3:
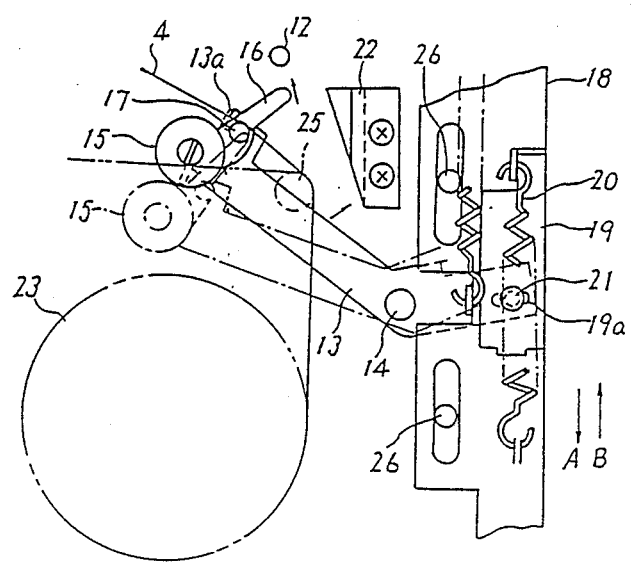
FIG. 3 is a top plan view showing the first loading condition in the device shown in FIG. 2.
Figure 5:
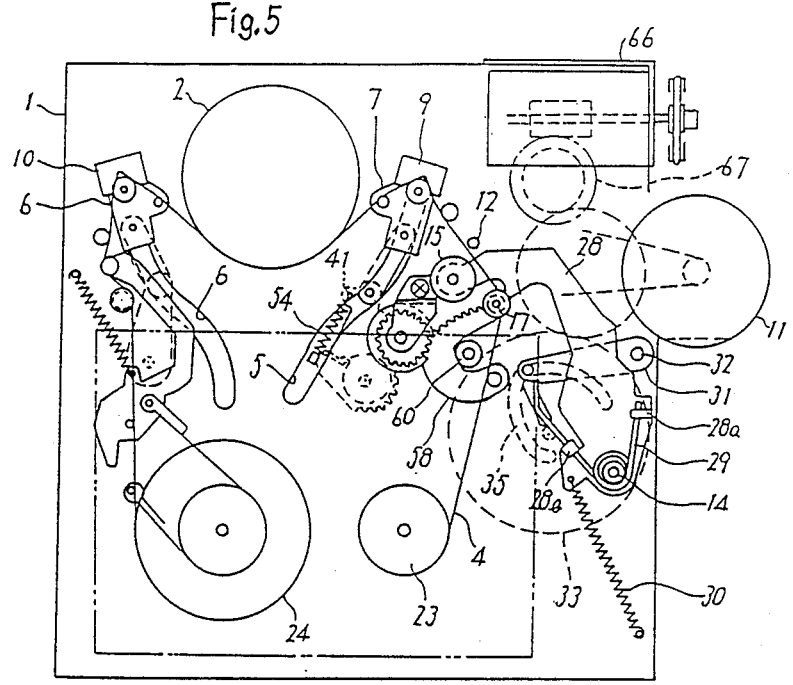
FIGS. 5 and 6 are top plan views showing a first loading condition and a second loading condition, respectively, of the mechanism shown in FIG. 1.
Figure 8:
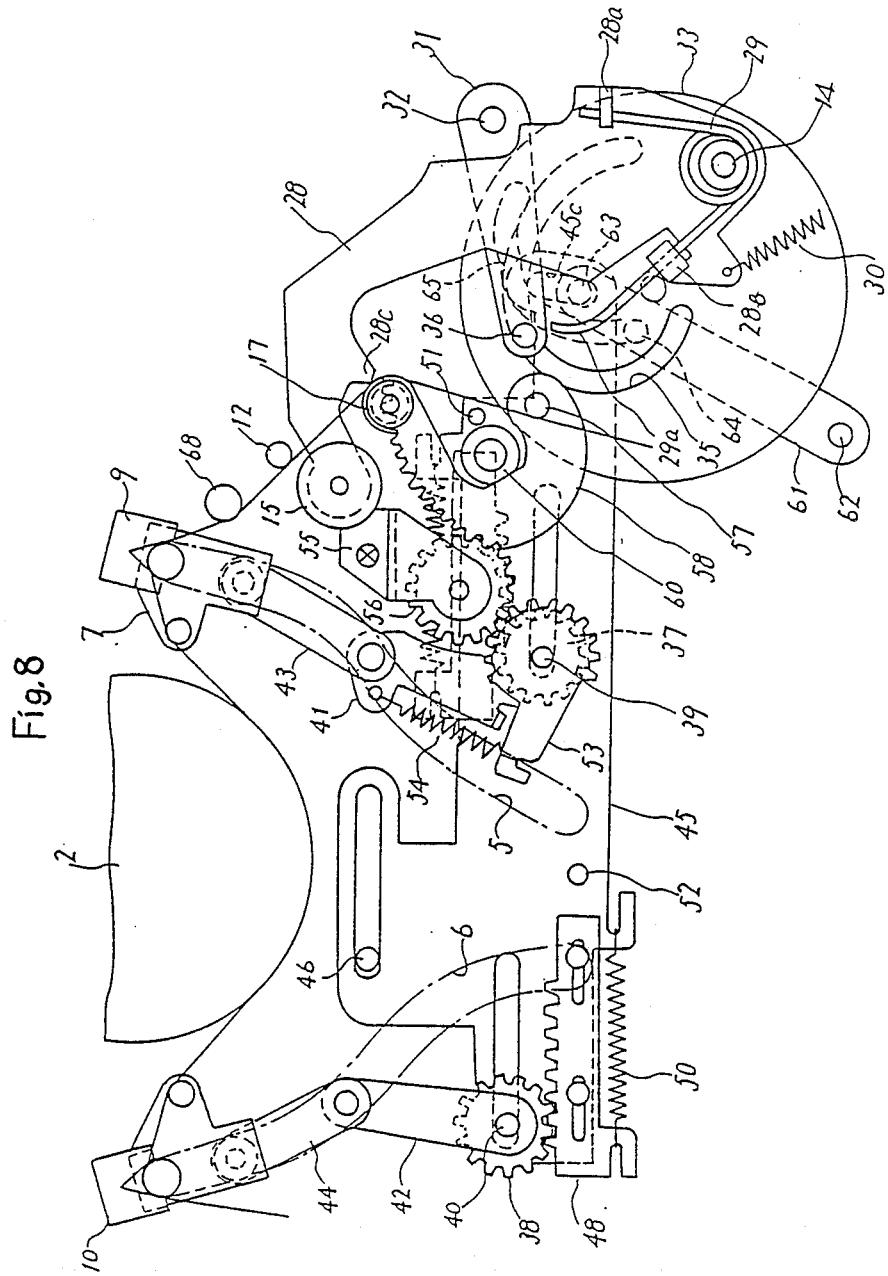
FIG. 8 is a top plan view showing the details of an essential portion of FIG. 5.

Thus, although the guide post members 7 and 8 are brought into engagement with the respective guide posts 9 and 10 and the position of the tape guide 17 is determined by the stopper member 60, the first loading condition in which the pinch roller 15 has not yet brought into contact with the capstan shaft 12 is established. This condition is illustrated in FIGS. 5 and 8. In this condition, the length of magnetic tape 4 can be moved by the rotation of the take-up reel 23. In other words, during this first loading condition, since the length of magnetic tape 4 is turned a predetermined angle around the rotary head drum 2 and the tape guide 17 is retained at the predetermined position, a high speed indexing operation can be performed by the rotation of the take-up reel 23.

Figure 6:
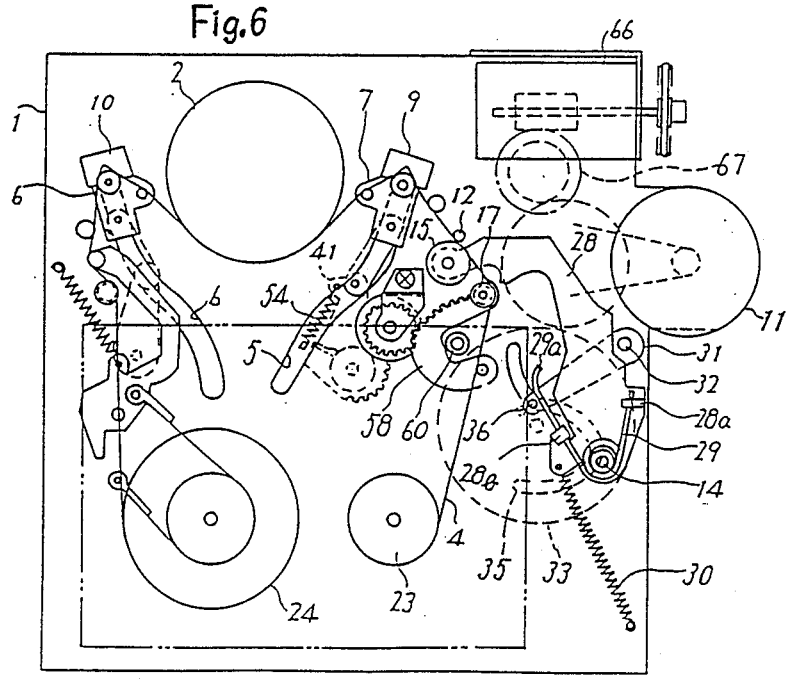

Also, when the loading drive motor 66 rotates followed by the clockwise rotation of the cam gear 33, the engagement pin 64 is guided in a concentric circle portion of a reduced diameter portion of the second cam groove 65 with the pivot movement of the transmission arm 61 brought to a halt and the movement of the slide plate 45 is therefore stopped. On the other hand, the lower pin end 36a engaged in the first cam groove 35 is guided along a helical groove portion from the concentric circular groove portion of the large diameter portion and the engagement lever 31 is therefore pivoted in the counterclockwise direction. Thereby, the upper pin end 36b is externally brought into engagement with a bent portion of the leg 29a of the torsion spring 29. The pressing force imparted by the torsion spring 29 to the hooks 28a and 28b of the pinch roller support arm 28 is so selected as to be sufficiently greater than the moment exerted by the tension spring 30 and, therefore, when the upper pin end 36b is brought into abutment with the torsion spring 29, the pinch roller support arm 28 can be pivoted together with the torsion spring 29 in the clockwise direction. Thereby, the pinch roller 15 presses the length of magnetic tape 4 against the capstan shaft 12 and, by the continued pivot movement of the engagement lever 31, the torsion spring 29 pressed by the upper pin end 36b is deformed in such a way as to cause the angle formed between the opposite legs of the torsion spring 29 to be reduced, thereby forming a clearance between the leg 29a and the hook 28b so that, by the effect of the pressing force of the torsion spring 29, the pinch roller 15 can be pressed under a predetermined pressure against the capstan shaft 12. In this way, a second loading condition shown in FIG. 6 is established.

In this second loading condition, the capstan shaft 12 is rotated by the rotation of the capstan drive motor 11 and the length of magnetic tape 4 is moved so that the recording or reproducing operation by the rotary head drum 2 can be performed.

Although in the foregoing embodiment it has been described that, in order to pivot the revolving arms 41 and 42 for moving the paired guide post members 7 and 8, the slide plate 45 is caused to move so that the revolving arms 41 and 42 can be pivoted through the rack members 47 and 48 and the revolving gears 37 and 38, respectively, the movement of slide plate 45 being accomplished by transmitting the rotary drive of the drive motor thereto through a linear motion transmitting means comprised of the cam gear 33 and the transmission arm 61, the present invention may not be always limited thereto, but may be applicable to the case wherein, for example, a sector shaped gear is pivoted by the cam gear to revolve the revolving arms 41 and 42 by a pair of revolving gears directly through the sector shaped gear or by way of an intermediate gear and, also, the tape guide arm 58 is pivoted through the intermediate gear meshed with the sector shaped gear thereby to synchronize the operation of the guide post members with the operation of the tape guide.

Also, while in the foregoing embodiment a structure is employed wherein the tape guide are 58 is imparted a torque acting in the counterclockwise direction by the biasing force of the tension spring 30 suspended to the pinch roller support arm 28 so that the backlash among the teeth 53a of the rotation transmitting body 53, the intermediate gear 56 and the teeth 58a of the tape guide arm 58 can be absorbed to enhance the positioning accuracy of the tape guide 17 during the unloading condition shown in FIGS. 4 and 7, an effect similar to that derived in the foregoing embodiment can be obtained even if the biasing body is directly engaged to the tape guide arm 58 to apply the torque acting in the counterclockwise direction as viewed in the figure.

The present invention is applicable to a recording and/or reproducing apparatus such as a digital tape recorder or a video tape recorder wherein the length of magnetic tape accommodated within the tape cassette is drawn out from the tape cassette.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A tape loading mechanism provided on a chassis having a pair of guide grooves therein, said mechanism comprising:

a pair of guide post members movable along the pair of guide grooves, said guide post members drawing a length of magnetic tape from a cassette placed in the mechanism while being turned a predetermined angle around a rotary head provide at the chassis when said guide post members are moved in a loading direction and the length of magnetic tape being returned to the cassette when the guide post members are moved in an unloading direction;

a pair of revolving arms operatively connected to the pair of guide post members for moving the pair of guide post members in the loading and unloading directions;

a loading motor attached to the chassis;

rotary motion translating and transmitting means operatively connected between the loading motor and the pair of revolving arms for pivoting the pair of revolving arms upon actuation of the loading motor;

a tape guide arm pivotally attached to the chassis for moving a tape guide to stretch the length of magnetic tape;

means for operatively connecting the tape guide arm to the rotary motion translating and transmitting means whereby said tape guide arm moves in synchronism with movement of the pair of guide post members;

a stopper member secured to the chassis for stopping pivotal movement of the tape guide arm at a predetermined position during loading of the tape; and biasing means for pressing the tape guide arm against the stopper member when the tape guide arm is pivoted to and stopped at the predetermined position;

said rotary motion translating and transmitting means further comprises;

a rotatable cam gear operatively connected to the loading motor, said gear having a first and second side with a cam groove provided in at least one of the sides, a transmission arm having an engagement pin mounted thereon, said engagement pin being positioned in the cam groove;

a slide plate operatively connected to said transmission arm, said slide plate being movable in one of a first and second direction upon rotation of the cam gear by the loading motor and movement of the transmission arm in response thereof, and means for pivoting the pair of revolving arms upon movement of the slide plate in the first or second direction, said means for pivoting being operatively connected between said slide plate and the pair of revolving arms.

2. The tape leading mechanism as recited in claim 1, wherein the means for pivoting comprises:

a pair of rack members attached to the slide plate; and a pair of revolving arm gears, one of each of the pair of revolving arm gears being meshed with one of the rack members and being attached to one of the revolving arms, whereby movement of the slide plate in the first or second direction causes rotation of each of the revolving arm gears and pivoting of each of the revolving arms.

3. The tape loading mechanism as recited in claim 2, further comprising a link pivotally connected between each of the revolving arms and the pair of guide post members.

4. The tape loading mechanism as recited in claim 2, wherein the transmission arm is pivotally attached to the chassis and wherein a transmission pin connects the transmission arm to the slide plate.

5. The tape loading mechanism as recited in claim 2, wherein said means for connecting the tape guide arm to the rotary motion translating and transmitting means comprises:

a rotation transmitting body connected with one of the pair of revolving arm gears thereby being movable in synchronism with the one revolving arm gear, said rotation transmitting body having a toothed portion; and an intermediate gear provided between said rotation transmitting body and the tape guide arm, said intermediate gear having teeth meshed with the toothed portion of the rotation transmitting body;

said tape guide arm having a toothed portion in engagement with the teeth of the intermediate gear, whereby rotation of the one of the pair of revolving arm gears synchronously rotates said rotation transmitting body which rotates said intermediate gear and pivots said tape guide arm.

6. The tape loading mechanism as recited in claim 5, wherein the tape guide arm generally has a U-shaped with one end thereof being pivotally attached to the chassis and the other end thereof mounting a tape guide for engaging the length of magnetic tape, an outer side of the tape guide arm having the toothed portion and an inner side of the tape guide arm engaging the stopper member when said tape guide arm moves to the predetermined position.

7. The tape loading mechanism as recited in claim 4, wherein said means for connecting the tape guide arm to the rotary motion translating and transmitting means comprises:

a rotation transmitting body connected with one of the pair of revolving arm gears thereby being movable in synchronism with the one revolving arm gear, said rotation transmitting body having a toothed portion; and an intermediate gear provided between said rotation transmitting body and the tape guide arm, said intermediate gear having teeth meshed with the toothed portion of the rotation transmitting body;

said tape guide arm having a toothed portion in engagement with the teeth of the intermediate gear, whereby rotation of the one of the pair of a revolving arm gears synchronously rotates said rotation transmitting body which rotates said intermediate gear and pivots said tape guide arm.

8. The tape loading mechanism as recited in claim 7, wherein the tape guide arm generally has a U-shape with one end thereof being pivotally attached to the chassis and the other end thereof mounting a tape guide for engaging the length of magnetic tape, an outer side of the tape guide arm having the toothed portion and an inner side of the tape guide arm engaging the stopper member when said tape guide arm moves to the predetermined position.

9. The tape loading mechanism as recited in claim 5, further comprising means connected between the rotation transmitting body and one of the pair of revolving arms for urging the rotation transmitting body to move in a direction to move the tape guide arm away from the predetermined position.

10. The tape loading mechanism as recited in claim 9, further comprising means for urging the slide plate to move in the first direction, movement of the slide plate in the first direction causing said means for pivoting the pair of revolving arms to move the pair of revolving arms in the unloading direction, said means for urging the slide plate being stronger than the means for urging the rotation transmitting body.

11. The tape loading mechanism as recited in claim 1, further comprising a pinch roller support arm pivotally attached to the chassis, said pinch roller support arm having an abutment which is engaged by the tape guide arm to move the pinch roller support arm to a first position when the tape guide arm stretches the length of magnetic tape, said pinch roller support arm having a pinch roller on one end thereof, said pinch roller being free of contact with the magnetic tape when said pinch roller support arm pivots to the first position.

12. The tape loading mechanism as recited in claim 11, wherein said rotatable cam gear has a second cam groove on a side opposite to the side of the cam gear having the cam groove engaged by the transmission arm engagement pin, said tape loading mechanism further comprising:

an engagement lever pivotally attached to the chassis, said engagement lever having an upper and lower engagement pin, the lower engagement pin being positioned in the second cam groove of the cam gear; and means positioned on the rotatable cam gear for engaging the upper engagement pin of the engagement lever and thereafter moving the pinch roller support arm from the first position to a second position upon continued rotation of the rotatable cam gear, said pinch roller engaging the magnetic tape when the pinch roller support arm is moved to the second position.

13. The tape loading mechanism as recited in claim 12, wherein the means for engaging the upper engagement pin comprises a torsion spring having opposite ends thereof engaged in respective hooks formed in the pinch roller support arm, said upper engagement pin abuts the torsion spring upon movement of the rotatable cam gear when said pinch roller support arm is in the first position and thereafter the pinch roller support arm is moved to the second position by continued rotation of the rotatable cam gear, the torsion spring has an angle formed between opposite legs thereof, said angle being reduced by the upper engagement pin pressing against one of the legs of the torsion spring as said pinch roller support arm moves from the first to the second position due to continued rotation of the cam gear to thereby apply a predetermined pressure to the pinch roller support arm.

14. The tape loading mechanism as recited in claim 13, further comprising a tension spring attached between said chassis and the pinch roller support arm for urging said pinch roller support arm away from the second position to the first position and away from the first position to a rest position.

* * * * *